United States Patent
Cheng et al.

(10) Patent No.: US 9,533,710 B2
(45) Date of Patent: Jan. 3, 2017

(54) TWELVE-CORNERED STRENGTHENING MEMBER

(75) Inventors: James Chih Cheng, Troy, MI (US); Raj Jayachandran, Canton, MI (US); Ching-Hung Chuang, Northville, MI (US); Yiping Xie, Ann Arbor, MI (US); Yuan Wang, Novi, MI (US); Tau Tyan, Northville, MI (US); Leonard Anthony Shaner, New Baltimore, MI (US); Yu-Kan Hu, Ypsilanti, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 813 days.

(21) Appl. No.: 12/891,801

(22) Filed: Sep. 27, 2010

(65) Prior Publication Data

US 2011/0015902 A1 Jan. 20, 2011

Related U.S. Application Data

(63) Continuation-in-part of application No. 12/233,808, filed on Sep. 19, 2008.

(51) Int. Cl.
G06G 7/48 (2006.01)
B62D 21/15 (2006.01)
F16F 7/12 (2006.01)

(52) U.S. Cl.
CPC ............ B62D 21/152 (2013.01); F16F 7/128 (2013.01); Y02T 10/82 (2013.01)

(58) Field of Classification Search
USPC .......................................................... 703/8
See application file for complete search history.

(56) References Cited

U.S. PATENT DOCUMENTS

| 1,951,292 | A | | 3/1934 | Cahill |
| 2,205,893 | A | | 6/1940 | Unger |
| 2,340,003 | A | | 1/1944 | McDermott |
| 2,837,347 | A | * | 6/1958 | Barenyi ................. B62D 21/02 280/796 |

(Continued)

FOREIGN PATENT DOCUMENTS

| JP | 08-337183 | 12/1996 |
| JP | 3897542 B2 | 3/2007 |

(Continued)

OTHER PUBLICATIONS

JP08-337183 English Abstract.

(Continued)

*Primary Examiner* — Saif Alhija
(74) *Attorney, Agent, or Firm* — Jones Robb, PLLC; Jason Rogers

(57) ABSTRACT

A method for optimizing a twelve-cornered strengthening member comprises: modeling a vehicle assembly including a strengthening member having a twelve-cornered cross section; parameterizing a geometry of the strengthening member with a plurality of control parameters; defining a design of experiment using the plurality of control parameters; modeling a vehicle using the vehicle assembly; simulating a frontal impact event with the vehicle; generating a response surface based on the frontal impact event; and determining a set of optimized control parameters for the strengthening member based on the response surface.

31 Claims, 16 Drawing Sheets

(56) References Cited

U.S. PATENT DOCUMENTS

| | | | |
|---|---|---|---|
| 2,856,226 A * | 10/1958 | Purdy | B62D 21/06 280/793 |
| 3,092,222 A | 6/1963 | Heinle | |
| 3,209,432 A | 10/1965 | Cape | |
| 3,412,628 A | 11/1968 | De Gain | |
| 4,018,055 A | 4/1977 | Le Clerq | |
| 4,364,216 A | 12/1982 | Koller | |
| 5,431,445 A | 7/1995 | Wheatley | |
| 5,480,189 A | 1/1996 | Davies et al. | |
| 5,729,463 A * | 3/1998 | Koenig | B23K 11/11 700/98 |
| 5,913,565 A | 6/1999 | Watanabe | |
| 6,068,330 A | 5/2000 | Kasuga et al. | |
| 6,179,355 B1 | 1/2001 | Chou et al. | |
| 6,371,540 B1 | 4/2002 | Campanella et al. | |
| 6,523,576 B2 | 2/2003 | Imaeda et al. | |
| 6,588,830 B1 | 7/2003 | Schmidt et al. | |
| 6,705,653 B2 | 3/2004 | Gotanda et al. | |
| 6,752,451 B2 * | 6/2004 | Sakamoto | B21C 1/22 29/897.2 |
| 6,799,794 B2 | 10/2004 | Mochidome et al. | |
| 6,893,065 B2 | 5/2005 | Seksaria et al. | |
| 7,044,515 B2 | 5/2006 | Mooijman et al. | |
| 7,252,314 B2 | 8/2007 | Tamura et al. | |
| 7,264,274 B2 | 9/2007 | Ridgway et al. | |
| 7,303,219 B2 | 12/2007 | Trabant et al. | |
| 7,357,445 B2 | 4/2008 | Gross et al. | |
| 7,407,219 B2 | 8/2008 | Glasgow et al. | |
| 7,445,097 B2 | 11/2008 | Tamura et al. | |
| 7,926,160 B2 | 4/2011 | Zifferer et al. | |
| 8,459,726 B2 | 6/2013 | Tyan et al. | |
| 8,469,416 B2 | 6/2013 | Haneda et al. | |
| 8,539,737 B2 | 9/2013 | Tyan et al. | |
| 8,641,129 B2 | 2/2014 | Tyan et al. | |
| 8,659,659 B2 | 2/2014 | Bradai et al. | |
| 2002/0059087 A1 * | 5/2002 | Wahlbin | G06Q 10/10 705/4 |
| 2002/0153719 A1 | 10/2002 | Taguchi | |
| 2003/0085592 A1 | 5/2003 | Seksaria et al. | |
| 2005/0028710 A1 | 2/2005 | Carpenter et al. | |
| 2006/0033363 A1 | 2/2006 | Hillekes et al. | |
| 2006/0181072 A1 | 8/2006 | Tamura et al. | |
| 2006/0202493 A1 | 9/2006 | Tamura et al. | |
| 2006/0202511 A1 | 9/2006 | Tamura et al. | |
| 2006/0249342 A1 | 11/2006 | Canot et al. | |
| 2008/0012386 A1 | 1/2008 | Kano et al. | |
| 2008/0030031 A1 | 2/2008 | Nilsson | |
| 2008/0036242 A1 | 2/2008 | Glance et al. | |
| 2008/0098601 A1 | 5/2008 | Heinz et al. | |
| 2008/0106107 A1 | 5/2008 | Tan et al. | |
| 2008/0185852 A1 | 8/2008 | Suzuki et al. | |
| 2009/0026777 A1 | 1/2009 | Schmid et al. | |
| 2009/0085362 A1 | 4/2009 | Terada et al. | |
| 2009/0102234 A1 | 4/2009 | Heatherington et al. | |
| 2009/0174219 A1 | 7/2009 | Foreman | |
| 2010/0064946 A1 | 3/2010 | Watson | |
| 2010/0066124 A1 | 3/2010 | Terada et al. | |
| 2010/0072788 A1 | 3/2010 | Tyan et al. | |
| 2010/0102592 A1 | 4/2010 | Tyan et al. | |
| 2011/0015902 A1 | 1/2011 | Cheng et al. | |
| 2012/0261949 A1 | 10/2012 | Tyan et al. | |
| 2013/0300138 A1 | 11/2013 | Banasiak et al. | |

FOREIGN PATENT DOCUMENTS

| | | |
|---|---|---|
| JP | 04-371059 B2 | 11/2009 |
| JP | 5348910 B2 | 11/2013 |

OTHER PUBLICATIONS

Office Action dated Aug. 19, 2011 from patented U.S. Appl. No. 12/233,808.
Office Action dated Mar. 7, 2012 from patented U.S. Appl. No. 12/233,808.
Office Action dated Jul. 31, 2012 from patented U.S. Appl. No. 12/233,808.
Response to Office Action dated Aug. 19, 2011 from patented U.S. Appl. No. 12/233,808.
Response to Office Action dated Mar. 7, 2012 from patented U.S. Appl. No. 12/233,808.
Office Action dated Jul. 20, 2012 from patented U.S. Appl. No. 12/651,614.
Response to Office Action dated Jul. 20, 2012 from patented U.S. Appl. No. 12/651,614.
Ali Najafi et al., "Mechanics of Axial Plastic Collapse in Multi-Cell, Multi-Corner Crush Tubes," sciencedirect.com, Sep. 1, 2010.
Xiong Zhang et al., "Crushing Analysis of Polygonal Columns and Angle Elements," sciencedirect.com, Jun. 27, 2009.
Sivakumar Palanivelua et al., "Comparison of the Crushing Performance of Hollow and Foam-Filled Small-Scale Composite Tubes With Different Geometrical Shapes for Use in Sacrificial Structures," sciencedirect.com, Jun. 1, 2010.
Fyllingen et al., "Simulations of a Top-Hat Section Subjected to Axial Crushing Taking Into Account Material and Geometry Variations," sciencedirect.com, Jul. 31, 2008.
Minoru Yamashita et al., "Quasi-Static and Dynamic Axial Crushing of Various Polygonal Tubes," sciencedirect.com, Jun. 2007.
Office Action dated Aug. 17, 2012 from U.S. Appl. No. 13/087,663.
Response to Office Action dated Aug. 17, 2012 from U.S. Appl. No. 13/087,663.
Response to Office Action dated Jul. 31, 2012 from U.S. Appl. No. 12/233,808.
Office Action dated Feb. 21, 2013 from U.S. Appl. No. 12/651,614.
Advisory Action dated May 6, 2013 from U.S. Appl. No. 12/651,614.
Office Action dated Feb. 27, 2013 from U.S. Appl. No. 12/233,808.
Response to Office Action dated Apr. 22, 2013 from U.S. Appl. No. 12/651,614.
Response to Office Action dated Oct. 31, 2012 from U.S. Appl. No. 12/233,808.
Response to Office Action dated Apr. 29, 2013 from U.S. Appl. No. 12/233,808.
Office Action dated Jun. 6, 2013 from U.S. Appl. No. 12/651,614.
Response to Office Action dated Jun. 6, 2013 from U.S. Appl. No. 12/651,614.
Office Action dated Jan. 3, 2014 from U.S. Appl. No. 14/010,115.
Office Action dated Jul. 18, 2014 from U.S. Appl. No. 14/010,115.
Comparison of Energy Absorption of Various Section Steel Tubes under Axial Compression and Bending Loading, The 21$^{st}$ Conference of Mechanical Engineering Network of Thailand, Oct. 19, 2007, p. 590-593.
Office Action dated Sep. 15, 2014 from U.S. Appl. No. 13/902,116.
Office Action dated Mar. 2, 2015 from U.S. Appl. No. 14/010,115.
Office Action dated Mar. 16, 2015 from U.S. Appl. No. 14/010,115.
Machine translation for JP08-337183.
Yoshiaka Nakazawa et al., "Development of Crash-Box for Passenger Car With High Capability for Energy Absorption", VIII International Conference on Computation Plasticity (COMPLAS VIII), Barcelona, 2005.
Nov. 16, 2012 Response to Office Action dated Aug. 17, 2012 from U.S. Appl. No. 13/087,663.
May 21, 2013 Response to Office Action dated Feb. 21, 2013 from U.S. Appl. No. 12/651,614.
Oct. 22, 2012 Response to Office Action dated Jul. 20, 2012 from U.S. Appl. No. 12/651,614.
Sep. 27, 2013 Response to Office Action dated Jun. 28, 2013 from U.S. Appl. No. 12/891,801.
Mar. 18, 2014 Response to Office Action dated Jan. 16, 2014 from U.S. Appl. No. 12/891,801.
Oct. 20, 2014 Response to Office Action dated Jul. 18, 2014 from U.S. Appl. No. 14/010,115.
Apr. 3, 2014 Response to Office Action dated Jan. 3, 2014 from U.S. Appl. No. 14/010,115.
Dec. 12, 2014 Response to Office Action dated Sep. 15, 2014 from U.S. Appl. No. 13/902,116.

(56) References Cited

OTHER PUBLICATIONS

Apr. 29, 2013 Response to Office Action dated Feb. 27, 2013 from U.S. Appl. No. 12/233,808.
Office Action dated Jun. 28, 2013 from U.S. Appl. No. 12/891,801.
Office Action dated Jan. 16, 2014 from U.S. Appl. No. 12/891,801.
Office Action dated Apr. 25, 2014 from U.S. Appl. No. 12/891,801.
Jul. 23, 2014 Response to Office Action dated Apr. 25, 2014 from U.S. Appl. No. 12/891,801.
Office Action dated Nov. 6, 2014 from U.S. Appl. No. 12/891,801.
Non-Final Office Action dated Nov. 1, 2016 from U.S. Appl. No. 14/930,299.

* cited by examiner

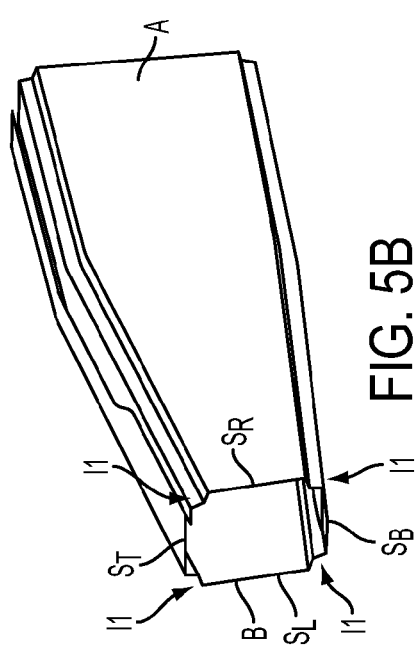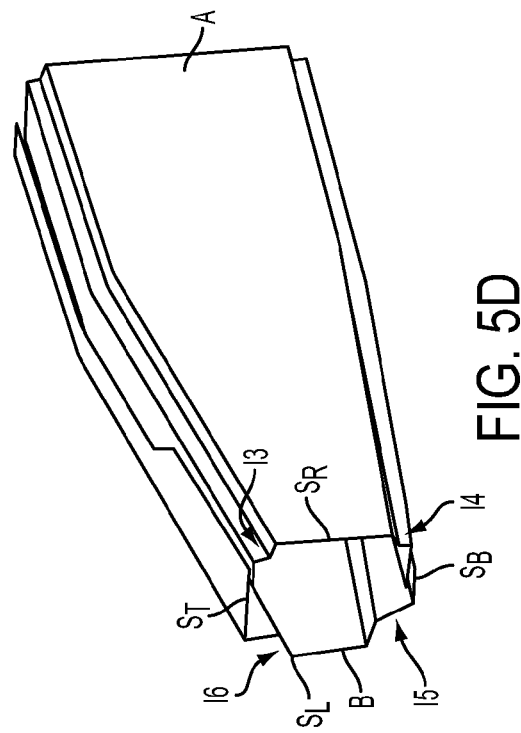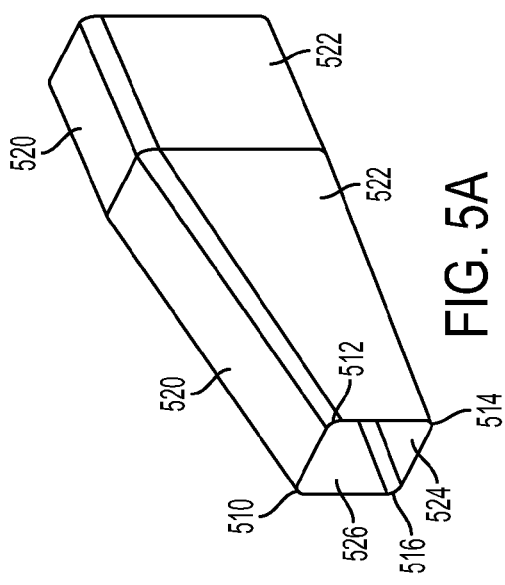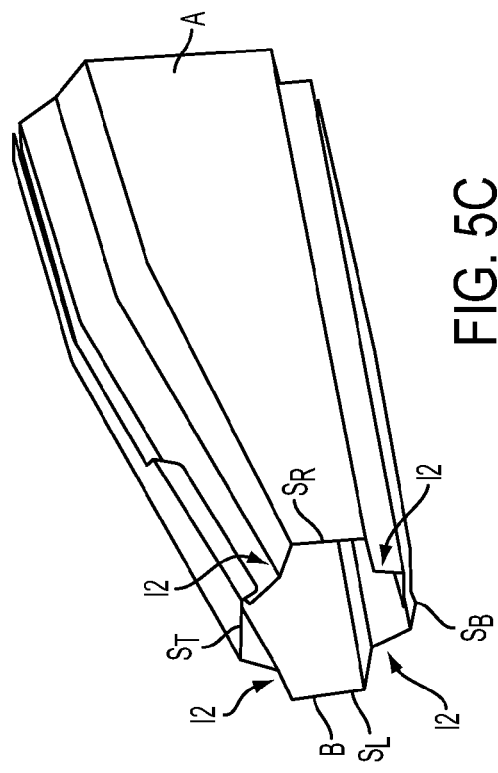

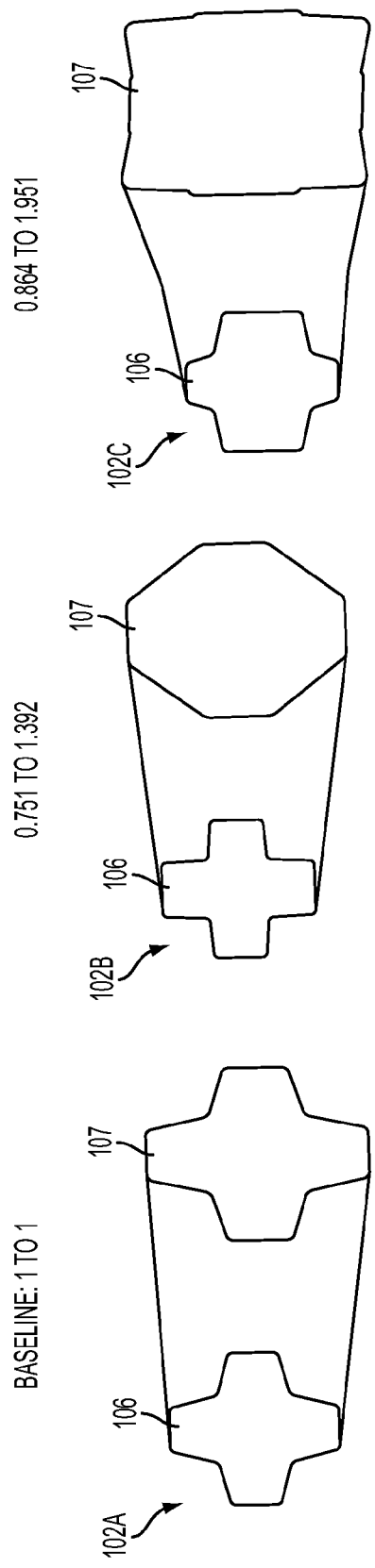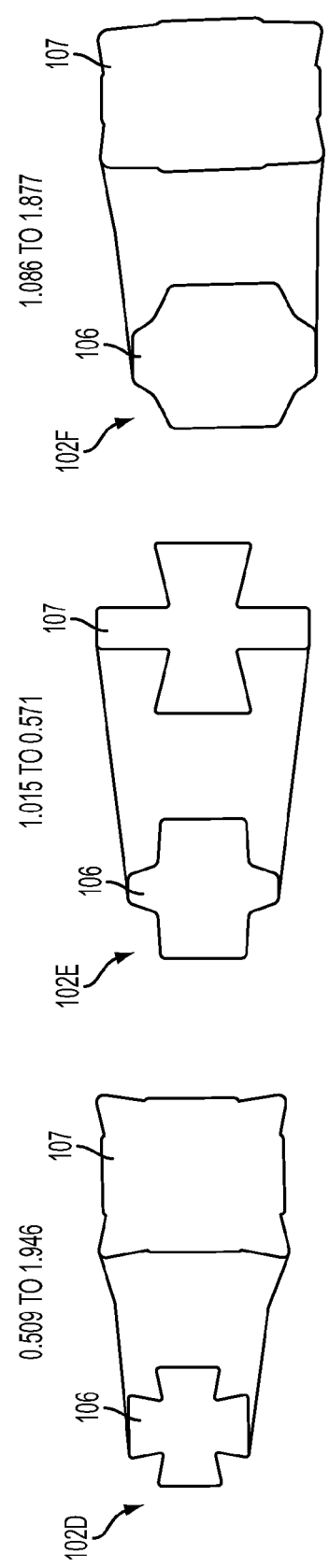

TWELVE-CORNERED STRENGTHENING MEMBER

This application is a continuation-in-part of U.S. patent application Ser. No. 12/233,808, filed Sep. 19, 2008, the entire content of which is incorporated herein by reference.

INTRODUCTION

The present teachings relate generally to a strengthening member for a vehicle body or other structures. The present teachings relate more specifically to a strengthening member having a twelve-cornered cross section.

BACKGROUND

It is desirable, for vehicle strengthening members, to maximize impact energy absorption and bending resistance while minimizing mass per unit length of the strengthening member.

When a compressive force is exerted longitudinally on a strengthening member, for example a force due to a front impact load on a vehicle's front rail or other strengthening member in the engine compartment, the strengthening member can crush in a longitudinal direction to absorb the energy of the collision. In addition, when a bending force is exerted on a strengthening member, for example a force due to a side impact load on a vehicle's front side sill, B-pillar or other strengthening member, the strengthening member can bend to absorb the energy of the collision.

U.S. Pat. No. 6,752,451 discloses a strengthening member having concave portions at the four corners of a basic rectangular cross section, resulting in four U-shaped portions forming an angle of 90 degrees with each other. To avoid cracks at the concave portions at the four corners and to increase strength, the concave portions have increased thickness and hardness. Increased thickness and hardness of the corner portions is disclosed to be achievable only by drawing or hydroforming, and therefore decreases manufacturing feasibility while increasing the mass per unit length of the strengthening member.

U.S. Pat. No. 6,752,451 makes reference to Japanese Unexamined Patent Publication No. H8-337183, which also discloses a strengthening member having concave portions at the four corners of a basic rectangular cross section, resulting in four U-shaped portions forming an angle of 90 degrees with each other. U.S. Pat. No. 6,752,451 states that its thickened concave portions provide improved crush resistance and flexural strength over H8-337183.

It may be desirable to provide a strengthening member configured to achieve the same or similar strength increase as provided by the thickened corners, while minimizing mass per unit length of the member and maintaining a high manufacturing feasibility.

It may further be desirable to provide a strengthening member that can achieve increased energy absorption and a more stable axial collapse when forces such as front and side impact forces are exerted on the strengthening member. Additionally, it may be desirable to provide a strengthening member that possesses improved noise-vibration-harshness performance due to work hardening on its corners.

In various applications, a strengthening member can be used as a crush can attached directly to a bumper beam in alignment with a vehicle's front rails. Crush cans may, for example, manage impact energy and intrusion during a frontal collision. To protect a vehicle's occupants in high speed crash events, a crush can (as part of a vehicle's front end) acts as an energy absorber to absorb a maximum amount of impact energy within a limited crush distance (i.e., a crush can must absorb a high amount of impact energy over a short crush distance). To minimize vehicle repair costs in low speed crash events, however, a crush can must both absorb energy with a limited stroke and be sequentially collapsible within a low speed protection zone to avoid damage to costly vehicle components.

It may be desirable, therefore, to provide a method of optimizing a strengthening member to provide crush cans that are progressive, stable, and energy efficient in both high and low speed frontal impact events.

SUMMARY

In accordance with certain embodiments, the present teachings provide a method for optimizing a twelve-cornered strengthening member comprising: modeling a vehicle assembly including a strengthening member having a twelve-cornered cross section; parameterizing a geometry of the strengthening member with a plurality of control parameters; defining a design of experiment using the plurality of control parameters; modeling a vehicle using the vehicle assembly; simulating a frontal impact event with the vehicle; generating a response surface based on the frontal impact event; and determining a set of optimized control parameters for the strengthening member based on the response surface.

The present teachings additionally or alternatively provide a crush can for an automotive vehicle, the crush can having a twelve-cornered cross section comprising sides and corners creating internal angles and external angles, wherein a geometry of the cross section varies between a front section and a rear section of the crush can and is optimized using a plurality of control parameters including a lateral width, a vertical width, a taper ratio, a front scaling factor, and a rear scaling factor.

It is to be understood that both the foregoing general description and the following detailed description are exemplary and explanatory only and are not restrictive of the present teachings, as claimed.

The accompanying drawings, which are incorporated in and constitute a part of this specification, illustrate exemplary embodiments of the present teachings and together with the description, serve to explain certain principles of the teachings.

BRIEF DESCRIPTION OF THE DRAWINGS

At least some features and advantages of the present teachings will be apparent from the following detailed description of exemplary embodiments consistent therewith, which description should be considered with reference to the accompanying drawings, wherein:

FIGS. 5A-5D illustrate perspective views of vehicle front rails without convolutions, having varying cross sections including twelve-cornered cross sections in accordance with the present teachings;

FIGS. 12A-12F illustrate how scaling factors in accordance with the present teachings can be utilized to change the shape of both a front and rear section of the crush can of FIG. 10;

DESCRIPTION OF EXEMPLARY EMBODIMENTS

Reference will now be made in detail to various embodiments, examples of which are illustrated in the accompanying drawings. The various exemplary embodiments are not intended to limit the disclosure. To the contrary, the disclosure is intended to cover alternatives, modifications, and equivalents.

The present teachings contemplate providing a strengthening member with a twelve-cornered cross section having a substantially increased stiffness throughout the sides and corners without increasing thickness within the corners. The strengthening member can achieve increased energy absorption and a more stable axial collapse when forces such as front and side impact forces are exerted on the strengthening member. The strengthening member can also possess improved durability and noise-vibration-harshness (NVH) performance due to work hardening on the twelve corners. The degrees of the internal and external angles of the present teachings can achieve the same strength increase as thickened corners, while minimizing mass per unit length of the member and maintaining a high manufacturing feasibility because the member can be formed by bending, rolling, stamping, pressing, hydro-forming, molding, extrusion, cutting, and forging.

Figure 1:
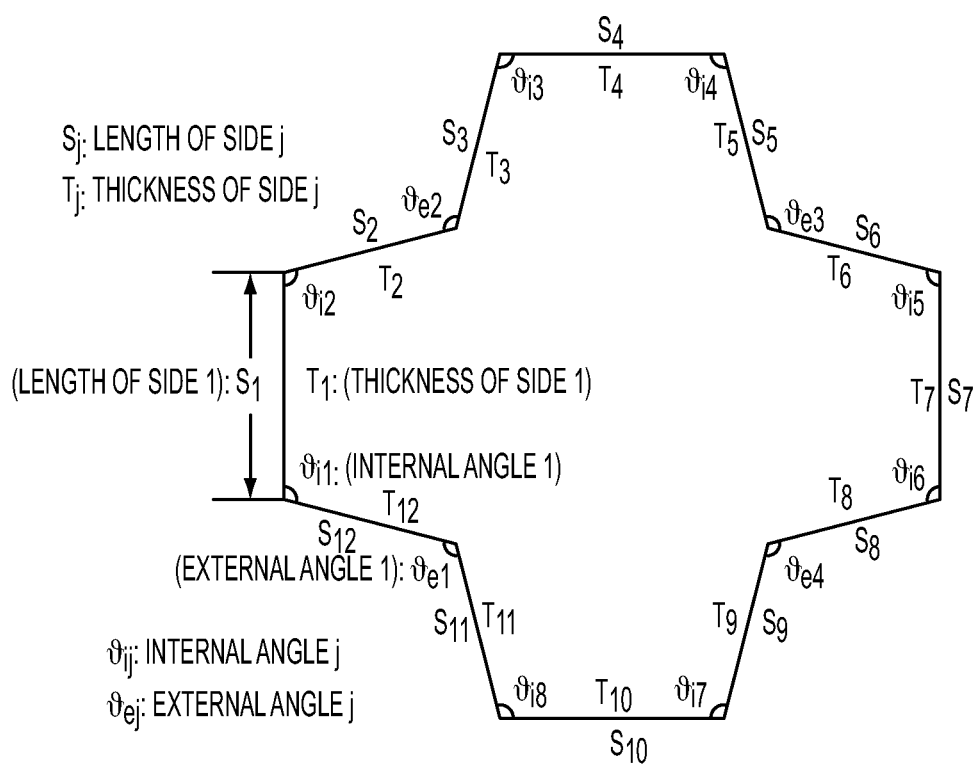
FIG. 1 is a cross sectional view of an exemplary embodiment of a twelve-cornered cross section for a strengthening member in accordance with the present teachings.

An exemplary embodiment of a twelve-cornered cross section for a strengthening member in accordance with the present teachings is illustrated in FIG. 1. As illustrated, the cross section comprises twelve sides having lengths $S_1$-$S_{12}$ and thicknesses $T_1$-$T_{12}$, eight internal corners with angles $\theta_{i1}$-$\theta_{i8}$ and four external corners with angles $\theta_{e1}$-$\theta_{e4}$. The internal and external angular degrees can be varied to achieve improved strength and other performance features (e.g., stability of folding pattern) compared to existing 90°-angled cross sections. This improved strength can obviate the need for increased corner thickness, which is an unexpected and unpredictable benefit of fine-tuning the internal and external angular degrees of a strengthening member having a twelve-cornered cross section. In accordance with various embodiments of the present teachings, each internal angle can range from about 100° to about 110°, and each external angle can range from about 105° to about 130°. The lengths $S_1$-$S_{12}$ and thicknesses $T_1$-$T_{12}$ of the sides can be varied to a certain degree, as would be understood by one skilled in the art, for example in accordance with available packaging space within a vehicle.

In certain embodiments of the present teachings, a thickness of the sides and corners can range from about 0.7 mm to about 6.0 mm. In certain embodiments, the thickness of the sides is substantially the same as the thickness of the corners.

Conventional strengthening members having square or rectangular cross sections are widely used due to their high manufacturing feasibility. Because a strengthening member with a twelve-cornered cross section in accordance with the present teachings has substantially increased strength and stiffness without requiring thicker corner portions, it has a higher manufacturing feasibility than previously-contemplated twelve-cornered members that have thickened 90° corners. While still providing a desired strength, a strengthening member in accordance with the present teachings can be formed in one or multiple sections by, for example, bending, rolling, stamping, pressing, drawing, hydro-forming, molding, extrusion, cutting, and/or forging. Thus-formed sections can be joined via welding, adhesive, fastening, or other known joining technologies.

In accordance with certain exemplary embodiments of the present teachings, the thickness of the strengthening member may vary, for example, within one side or from side to side to optimize the overall axial crush and bending performance. Examples of such varied thickness embodiments are illustrated in FIGS. 5D and 6D, which are described in detail below.

Figure 2:
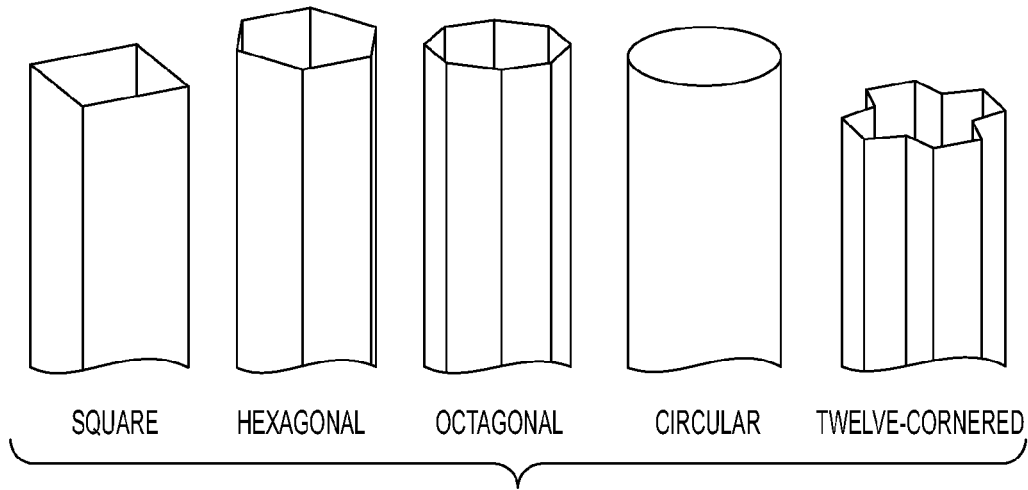
FIG. 2 illustrates perspective sectional views of strengthening members of varying cross sections having a substantially constant thickness and perimeter.
Figure 3:
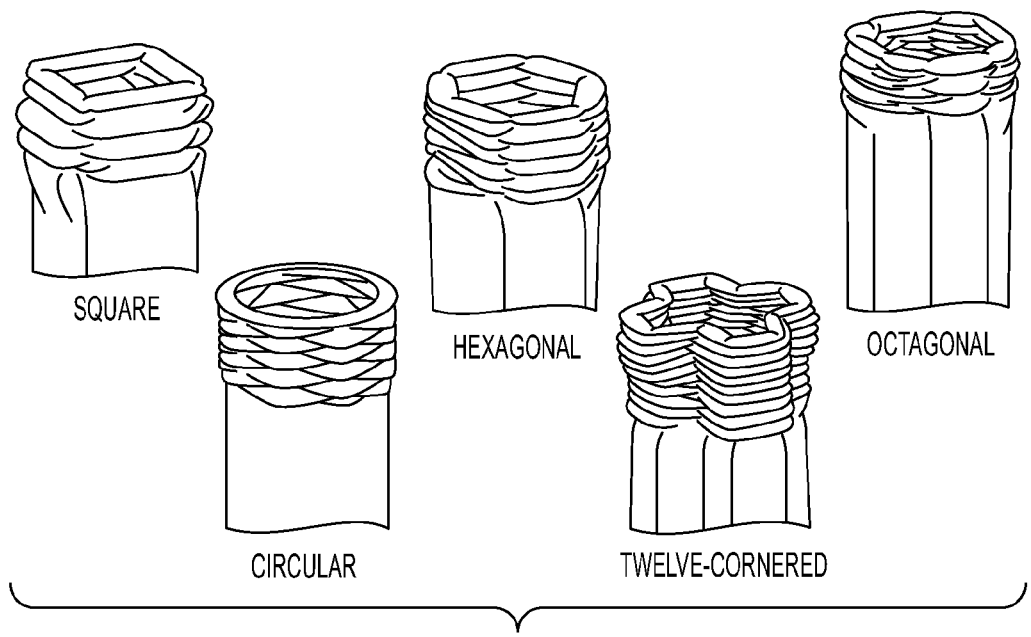
FIG. 3 illustrates perspective sectional views of the exemplary axial collapse of the strengthening members shown in FIG. 2.

In comparing crash energy absorption of strengthening members of varying shapes having the same thickness and perimeter, as illustrated in FIG. 2, for example for an impact with a rigid wall at 35 mph, a twelve-cornered cross section in accordance with the present teachings demonstrated the shortest crush distance and smallest folding length. A twelve-cornered cross section in accordance with the present teachings also demonstrated the most stable axial collapse and the highest crash energy absorption. In fact, a twelve-cornered cross section in accordance with the present teachings can achieve about a 100% increase in crash energy absorption over a square cross section and a 20-30% increase in crash energy absorption over hexagonal and octagonal cross sections. FIG. 3 illustrates an exemplary axial collapse of the strengthening members shown in FIG. 2. As can be seen, the strengthening member having a twelve-cornered cross section in accordance with the present teachings exhibits the shortest crush distance and most stable folding pattern.

Figure 4:
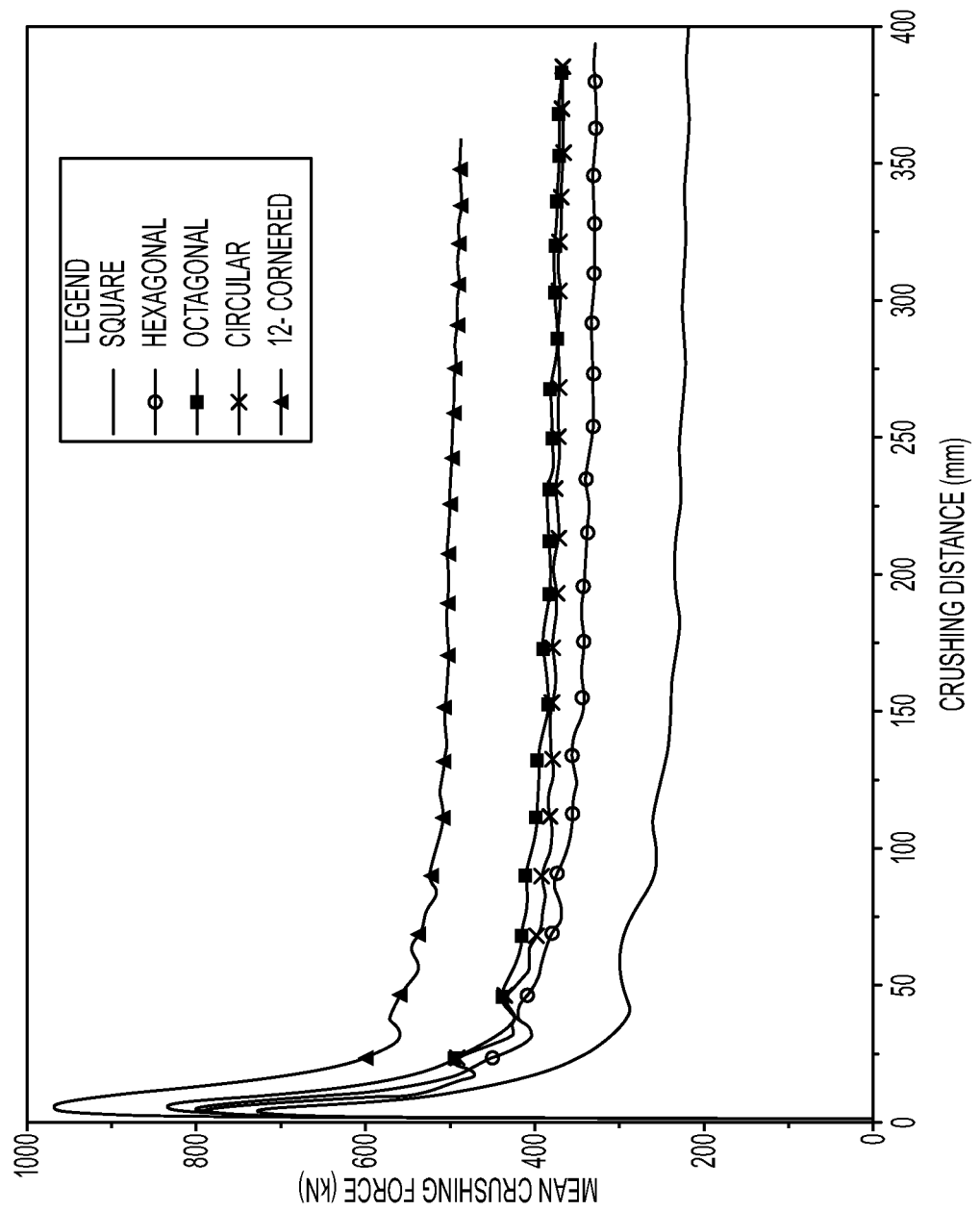
FIG. 4 is a graph of the mean crush force and associated axial crush distance for exemplary strengthening members having cross sections shown in FIG. 2.

FIG. 4 illustrates a graph of mean crush force for an impact with a rigid wall at 35 mph, in kN, exerted axially on exemplary strengthening members having the cross sections shown in FIG. 2. As can be seen, a strengthening member having a twelve-cornered cross section in accordance with the present teachings can sustain a much higher crushing force for a given resulting crushing distance. This allows improved impact energy management while minimizing mass per unit length.

A twelve-cornered cross section in accordance with the present teachings is contemplated for use with a number of structural members such as a front rail, a side rail, a cross member, roof structures, and other components that can benefit from increased crash energy absorption. In addition, the present teachings can be applied to both body-on-frame and unitized vehicles, or other types of structures.

FIGS. 5A-5D illustrate exemplary embodiments of a vehicle front rail having a cross section in accordance with the present teachings. The front rail is of a type without convolutions. FIG. 5A illustrates a front rail having a known, substantially rectangular cross section with four corners 510, 512, 514, 516 of about ninety degrees, and four sides 520, 522, 524, 526. FIGS. 5B through 5D illustrate front rails having twelve-cornered cross sections in accordance with the present teachings, the corner indentations 12 in FIG. 5C being greater than the indentations I1 in FIG. 5B. In these illustrated exemplary embodiments, the rails have a two-part construction comprising pieces A and B. The present teachings contemplate rails of other construction such as one-piece or even 3-or-more piece construction, the number of pieces in FIGS. 5A through 5D being exemplary only.

The embodiments of FIGS. 5B and 5C include top and bottom sides, $S_T$ and $S_B$ respectively, having substantially the same length as each other, and left and right sides, $S_L$ and $S_R$ respectively, also having substantially the same length as each other. Piece A includes right side $S_R$, part of bottom side $S_B$, and part of top side $S_T$. Piece B includes left side $S_L$, part of bottom side $S_B$, and part of top side $S_T$. To simplify FIGS. 5B-5D, all of the sides $S_1$ through $S_{10}$ illustrated in FIG. 1 are not labeled but are of course present. Similarly, the eight internal corners (angles: $\theta_{i1}$-$\theta_{i8}$) and four external corners (angles: $\theta_{e1}$-$\theta_{e4}$) illustrated in FIG. 1 are not labeled but are present.

FIG. 5D illustrates a front rail having a twelve-cornered cross section, the rail being formed with different depths of indentations, for example to accommodate packaging constraints of a vehicle's engine compartment. In accordance with such an embodiment needing to have a varied shape to accommodate engine compartment constraints, to achieve optimized axial crush performance, the thicknesses of the sides, angles of the corners, and indentation depths can all be adjusted to provide optimal strength, size and shape. In the example of FIG. 5D, corner indentations 13 and 14 have different depths, corner indentation 14 being shallower than corner indentation 13. Corner indentations 15 and 16 have substantially the same depth as each other, that depth differing from the depths of corner indentations 13 and 14. The top and bottom sides, $S_T$ and $S_B$ respectively, have different lengths, with top side $S_T$ being longer than bottom side $S_B$, and the left and right sides, $S_L$ and $S_R$ respectively, have differing lengths, with right side $S_R$ being longer than left side $S_L$. The present teachings also contemplate a twelve-cornered cross section where each of the corner indentations has a different depth and a different angle, and each of the sides has a different length, or where some of the sides have the same length and some of the corner indentations have the same depth and perhaps the same internal and external angles.

For a front rail comprising SAE1010 material, a front rail as illustrated in FIG. 5B (with shallower indentations) can save, for example, about 17% weight compared to a square or rectangular cross section, and a front rail as illustrated in FIG. 5C (with deeper indentations) can save, for example, about 35% weight. For a front rail comprising DP600 material, a front rail as illustrated in FIG. 5B (with shallower indentations) can save, for example, about 23% weight and a front rail as illustrated in FIG. 5C (with deeper indentations) can save, for example, about 47% weight. Such weight savings are realized because the increased strength of the twelve-cornered cross section allows the use of a thinner gauge material to provide the same strength.

Figure 6B:
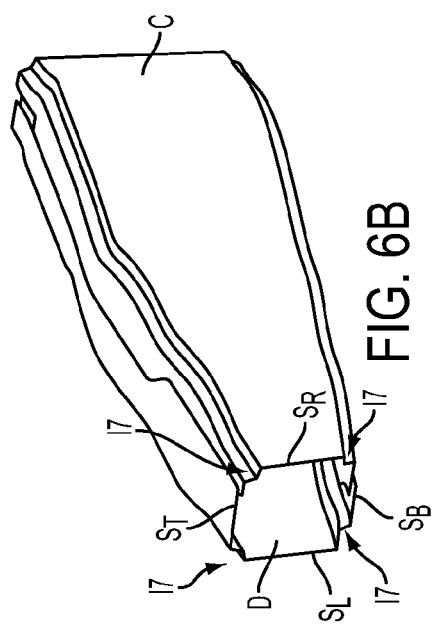
FIGS. 6A-6D illustrate perspective views of vehicle front rails with convolutions, having varying cross sections including twelve-cornered cross sections in accordance with the present teachings.
Figure 6D:
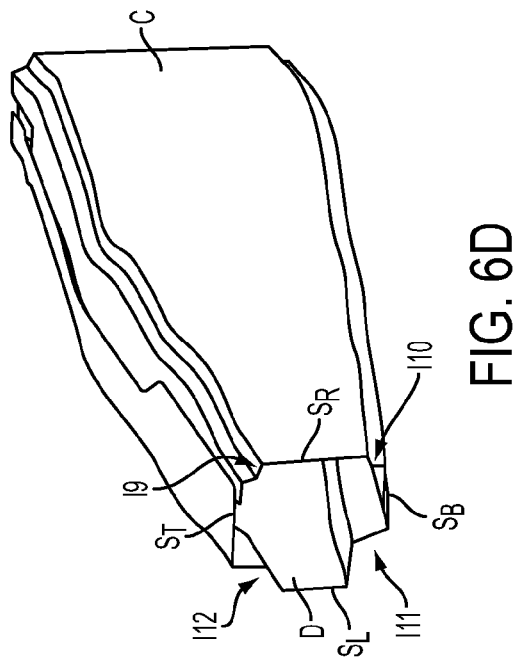
Figure 6A:
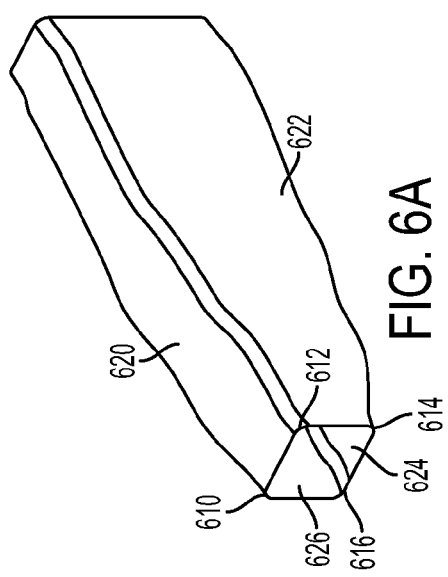
Figure 6C:
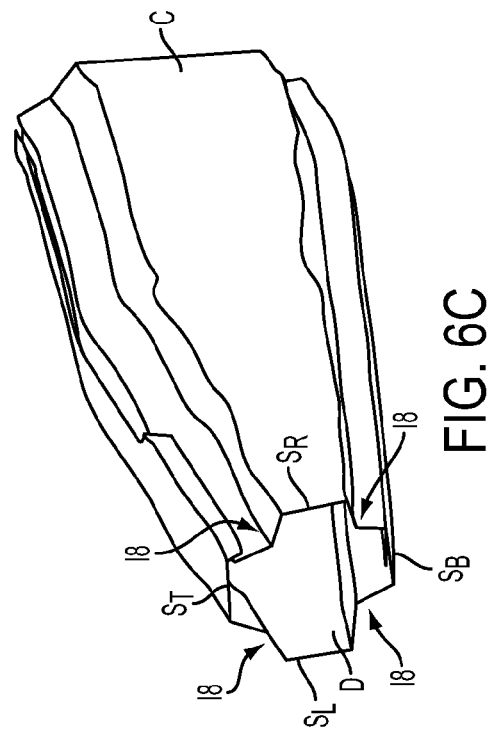

FIGS. 6A-6D illustrate exemplary embodiments of a vehicle front rail having a cross section in accordance with the present teachings. The front rail is of a type with convolutions. FIG. 6A illustrates a convoluted front rail having a known, substantially rectangular cross section with four corners 610, 612, 614, 616 of about ninety degrees, and four sides 620, 622, 624, and 626. FIGS. 6B through 6D illustrate convoluted front rails having twelve-cornered cross sections in accordance with the present teachings, the corner indentations 18 in FIG. 6C being greater than the indentations 17 in FIG. 6B. In these illustrated exemplary embodiments, the rails have a two-part construction with pieces C and D. As stated above, the two-piece constructions shown in FIGS. 6B through 6D are exemplary only and the present teachings contemplate rails of other construction such as one-piece or even 3-or-more piece construction.

The embodiments of FIGS. 6B and 6C include top and bottom sides, $S_T$ and $S_B$ respectively, having substantially the same length as each other, and left and right sides, $S_L$ and $S_R$ respectively, also having substantially the same length as each other. Piece C includes right side $S_R$, part of bottom side $S_B$, and part of top side $S_T$. Piece D includes left side $S_L$, part of bottom side $S_B$, and part of top side $S_T$. To simplify FIGS. 6B-6D, all of the sides $S_1$ through $S_{10}$, as illustrated in FIG. 1, are not labeled but are present. Similarly, the eight internal corners (angles: $\theta_{i1}$-$\theta_{i8}$) and four external corners (angles: $\theta_{e1}$-$\theta_{e4}$), as illustrated in FIG. 1, are not labeled but are present.

FIG. 6D illustrates a convoluted front rail having a twelve-cornered cross section, the rail being formed with different depths of indentations, for example to accommodate packaging constraints of a vehicle's engine compartment. In accordance with such an embodiment needing to have a varied shape to accommodate engine compartment constraints, to achieve optimized axial crush performance, the thicknesses of the sides, angles of the corners, and indentation depths can all be adjusted to provide optimal strength, size and shape. In the example of FIG. 6D, corner indentations I9 and I10 have different depths, with corner indentation I10 being shallower than corner indentation I9. Corner indentations I11 and I12 have substantially the same depth as each other, that depth differing from the depths of corner indentations I9 and I10. The top and bottom sides, $S_T$ and $S_B$ respectively, have different lengths, with top side $S_T$ being longer than bottom side $S_B$, and the left and right sides, $S_L$ and $S_R$ respectively, have differing lengths, with right side $S_R$ being longer than left side $S_L$. The present teachings also contemplate a twelve-cornered cross section where each of the corner indentations has a different depth and a different angle, and each of the sides has a different length, or where some of the sides have the same length and some of the corner indentations have the same depth and perhaps the same internal and external angles.

For a convoluted front rail comprising SAE1010 material, a front rail as illustrated in FIG. 6B (with shallower indentations) can save, for example, about 20% weight compared to a square or rectangular cross section, and a front rail as illustrated in FIG. 6C (with deeper indentations) can save, for example, about 32% weight. For a convoluted front rail comprising DP600 material, a front rail as illustrated in FIG. 6B (with shallower indentations) can save, for example, about 30% weight and a front rail as illustrated in FIG. 6C (with deeper indentations) can save, for example, about 41% weight.

Figure 7:
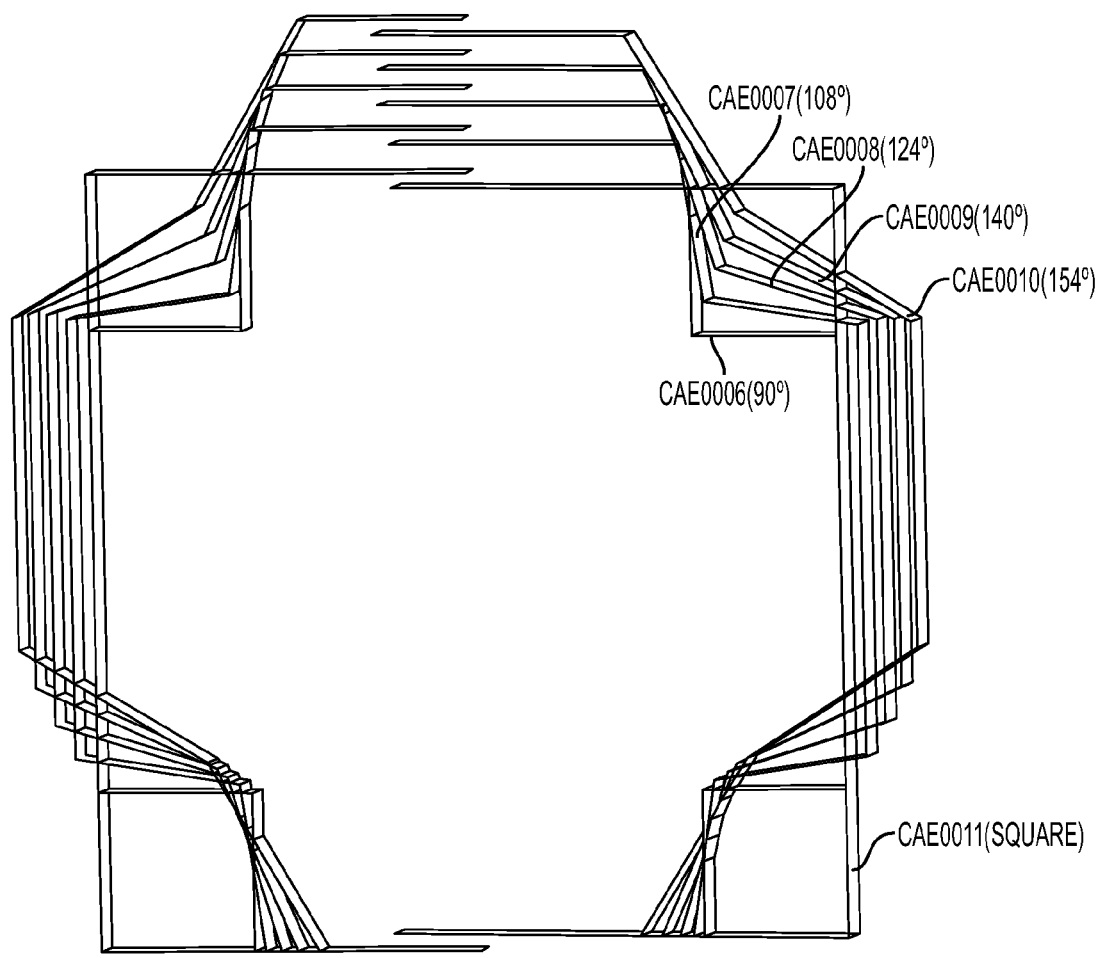
FIG. 7 illustrates comparative cross sectional geometries of twelve-cornered strengthening members having varying shapes and a four-cornered strengthening member having the same thickness and perimeter.
Figure 8:
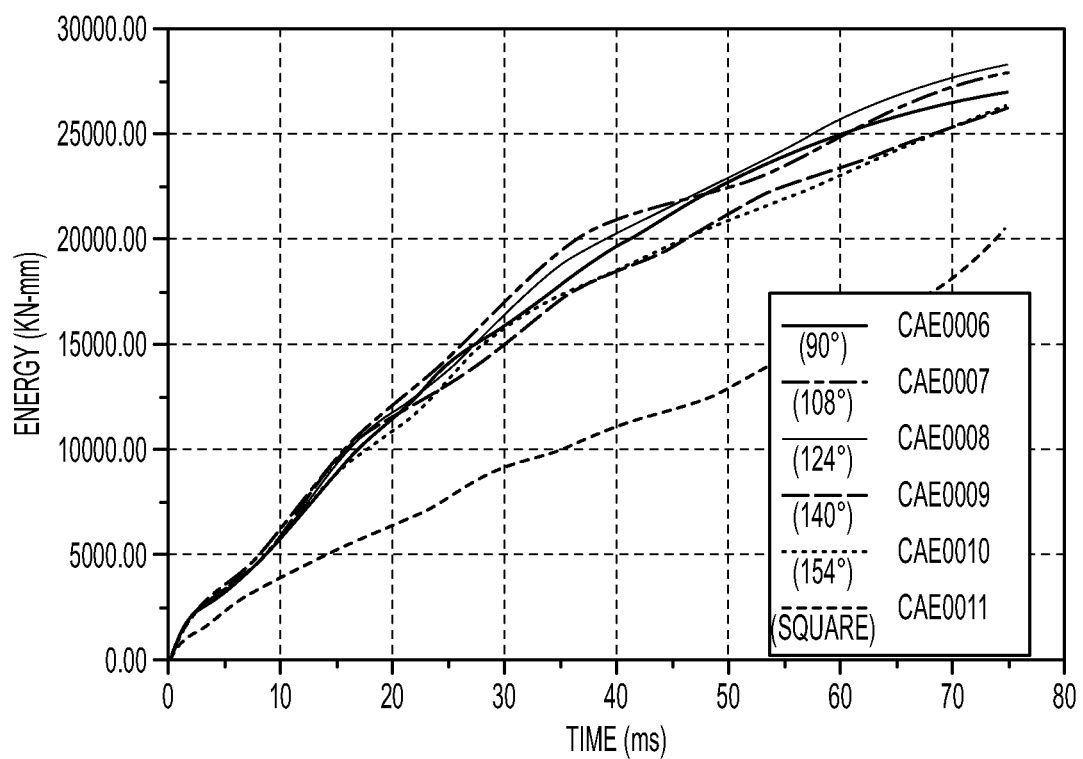
FIG. 8 is a graph showing the comparison of the crash energy absorbed (for a given force) by strengthening members having the exemplary cross sections illustrated in FIG. 7.

Strengthening members having a variety of cross sections are illustrated in FIG. 7. As can be seen, CAE006 has a twelve-cornered cross section with external angles of 90°. CAE007 has a twelve-cornered cross section with external angles of 108° in accordance with the present teachings. CAE008 has a twelve-cornered cross section with external angles of 124° in accordance with the present teachings. CAE009 has a twelve-cornered cross section with external angles of 140°. CAE010 has a twelve-cornered cross section with external angles of 154°. Finally, CAE011 has a square cross section. A comparison of the axial crush strength of the illustrated square and twelve-cornered cross sections having differing external angles is illustrated in FIG. 8. As can be seen, the overall axial crush strength of the strengthening member having a twelve-cornered cross section is far greater than that of the strengthening member having a square cross section.

As can further be seen, the exemplary strengthening members with twelve-cornered cross sections having external angles of 108° and 124° show an overall increase in axial crush strength over twelve-cornered cross sections having external angles of 90°. In fact, deviation of the angles from 90° such that each internal angle is about the same as other internal angles and ranges from about 100° to about 110°, and each external angle is about the same as other external angles and ranges from about 105° to about 130°, increases strength without negatively affecting the stability of a crush mode of the strengthening member. Such an increase in strength obviates the need for reinforcing (e.g., thickening) the concave portions at the four corners of the strengthening member, decreasing weight and cost and increasing manufacturing feasibility.

Strengthening members in accordance with the present teachings can comprise, for example, steel, aluminum, magnesium, fiberglass, nylon, plastic, a composite, or any other suitable materials. Exemplary implementations of the strengthening member can comprise, for example, a high strength steel such as, for example, DP590, DP590R, or HSLA350. These three steels have similar yield strengths, but DP590 and DP590R have a higher tensile strength than HSLA350. DP590R has a ferrite-bainite microstructure and a slightly higher yield-to-tensile strength ratio than DP590.

Figure 9:
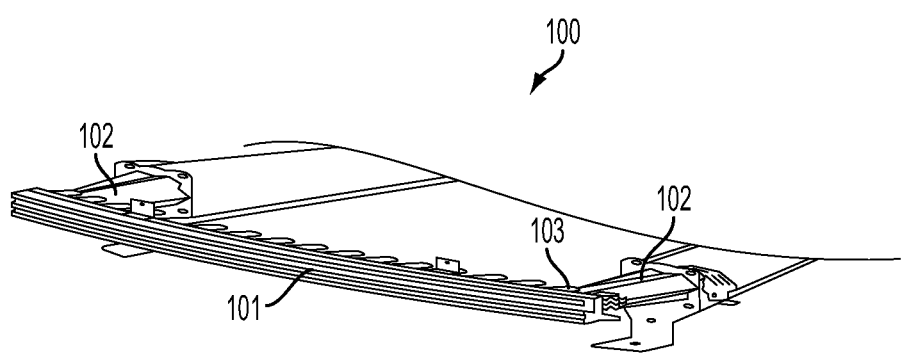
FIG. 9 is a perspective view of a vehicle assembly illustrating a strengthening member in accordance with the present teachings used as a crush can.
Figure 10:
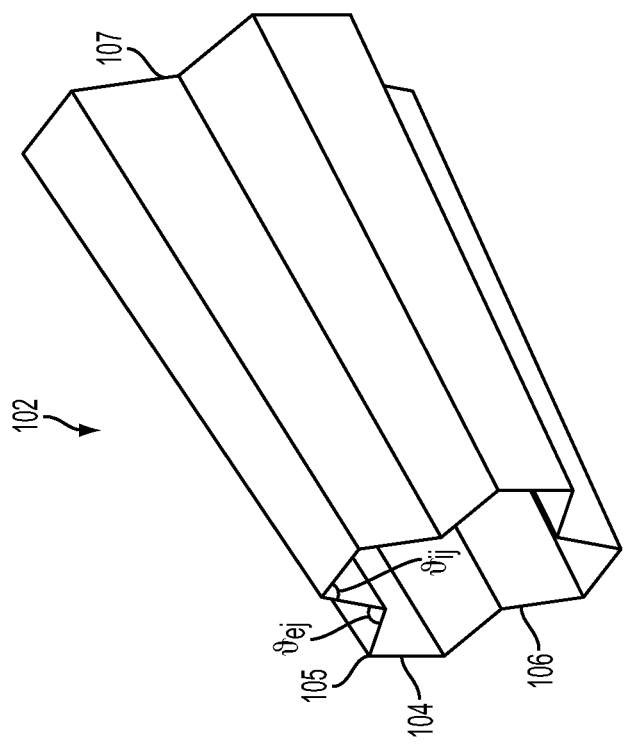
FIG. 10 is a perspective view of the crush can of FIG. 9.

In various applications, strengthening members, as detailed above, can be used as crush cans to manage impact energy and intrusion during a frontal collision. FIG. 9, for example, is a perspective view of a vehicle assembly 100 including a bumper 101 and crush cans 102. Crush cans 102 can be attached directly to a bumper beam 103 aligned with a vehicle's front rails (not shown). As shown in FIG. 10, the crush can 102 can have a twelve-cornered cross-section comprising sides 104 and corners 105 creating internal angles $\theta_{ij}$ and external angles $\theta_{ej}$. As illustrated in FIG. 1, for example, the cross section may comprise twelve sides having lengths $S_1$-$S_{12}$ and thicknesses $T_1$-$T_{12}$, eight internal corners with angles $\theta_{i1}$-$\theta_{i8}$ and four external corners with angles $\theta_{e1}$-$\theta_{e4}$. Those of ordinary skill in the art would understand that the embodiments illustrated in FIGS. 9 and 10 are exemplary only, and that a crush can in accordance with the present teachings may have various geometries (i.e., cross-sections) and can have various locations and/or configurations within a vehicle bumper assembly.

In accordance with certain embodiments of the present teachings, when using a twelve-cornered strengthening member as a crush can, the design of the crush can may be optimized to provide a desired crush result (i.e., with respect to energy absorption and crush distance) for both high and low speed frontal impact events.

As used herein, the term high speed frontal impact event refers to a crash wherein the front end of a vehicle impacts an object at a high speed, such as, for example, a crash wherein the front end of a vehicle impacts an object while the vehicle is going at least 30 mph. As those of ordinary skill in the art would understand, such events may be simulated, for example, by various high speed frontal crash modes (i.e., tests) designed to meet occupant injury metrics. Such modes, may include, for example, a 35 mph, 100% overlap, frontal rigid barrier mode (i.e., running a vehicle into a solid barrier at 35 mph); a 40 mph, 40% offset, deformable barrier mode (i.e., running a vehicle into a deformable barrier at 40 mph with a 40% offset so that only 40% of the front end of the vehicle impacts the barrier); and a 25-30 mph, 30° angular, rigid barrier mode (i.e., running a vehicle into a solid barrier at 25-30 mph and a 30° angle).

As used herein, the term low speed frontal impact event refers to a crash wherein the front end of a vehicle impacts an object at a low speed, such as, for example, a crash wherein the front end of a vehicle impacts an object while the vehicle is going 10 mph or less. As those of ordinary skill in the art would understand, such events may be simulated, for example, by various low speed frontal crash modes (i.e., tests) designed with objectives of minimizing the repair costs of a vehicle. Such modes may include, for example, a 15 kph (9.32 mph), 40% offset, 10° angular, rigid barrier mode (i.e., running a vehicle into a solid barrier at 15 kph and a 10° angle, with a 40% offset so that only 40% of the front end of the vehicle impacts the barrier).

In certain exemplary embodiments of the present teachings, the geometry of a cross section of a crush can be optimized using a plurality of control parameters. The control parameters may be generated, for example, using a parametric model of the crush can. As would be understood by those of ordinary skill in the art, any type of 3-dimensional structural modeling software and/or tools may be used to create the parametric model.

As shown below in Table 1 and illustrated in FIGS. 11A-11C, in certain embodiments, the geometry of the crush can may be parameterized with five control parameters, such as, for example, a lateral width (Width_y), a vertical width (Width_z), a taper ratio, a front scaling factor, and a rear scaling factor.

TABLE 1

Summary of Control Parameters

| Parameter | Baseline | Lower Bound | Upper Bound |
|---|---|---|---|
| Width_y | 0 | −5 mm | 15 mm |
| Width_z | 0 | −5 mm | 15 mm |
| Taper Ratio | 1.0 | 0.7 | 1.2 |
| Front Scaling Factor | 1.0 | 0.5 | 2.0 |
| Rear Scaling Factor | 1.0 | 0.5 | 2.0 |

Figure 11A:
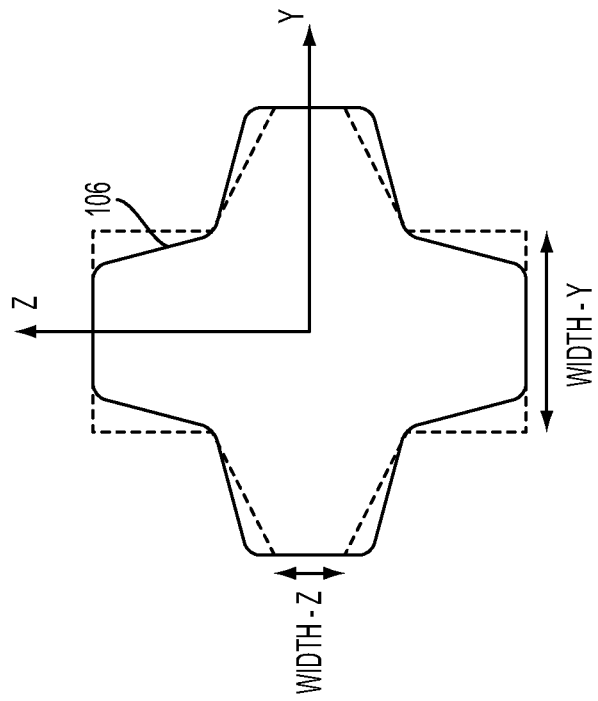
FIGS. 11A-11C illustrate a parametric modeling process in accordance with the present teachings for the crush can of FIG. 10.

As illustrated in FIG. 11A, starting from a baseline twelve-cornered geometry (shown by the solid line), a front section 106 of the crush can 102 may be parameterized in both a lateral (Y) direction and a vertical (Z) direction by adjusting a lateral width (Width-y) and a vertical width (Width-z). Adjusting such parameters provides a dimensional change for the front section 106 of the crush can 102 as illustrated by the dotted line in FIG. 11A. In other words, the lateral and vertical widths may comprise new dimensions for the front section 106 of the crush can 102. As shown in Table 1, based on a defined design of experiment (DOE) for a particular design application, the dimensions of the front section 106 of the crush can 102 may be changed by varying the lateral and vertical widths (Width_y and Width_z, respectively) between an upper and lower bound. In certain embodiments, for example, the lateral width of the front section 106 may be varied in a range of about −5 mm from a baseline lateral width to about 15 mm from the baseline lateral width; and the vertical width of the front section 106 may be varied in a range of about −5 mm from a baseline vertical width to about 15 mm from the baseline vertical width.

Figure 11B:
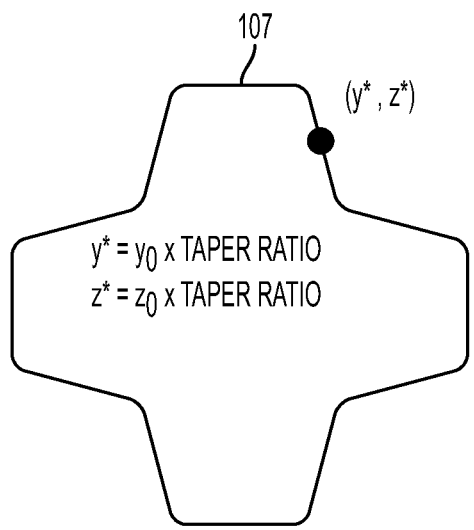

As illustrated in FIG. 11B, a taper ratio may then be used to raise or lower the height ratio between the front section 106 and a rear section 107 of the crush can 102. In this parameterization process, coordinates $y_0$ and $z_0$ of the rear section 107 of the crush can 102 are multiplied by a given taper ratio to form new coordinates $y^*$ and $z^*$. As shown in Table 1, based on the defined DOE, the coordinates $y_0$ and $z_0$ may be multiplied by a taper ratio between an upper and lower bound. In certain embodiments, for example, the coordinates $y_0$ and $z_0$ may be multiplied by a taper ratio in a range of about 0.74 (i.e., to raise the height ratio between the front and rear sections) to about 1.2 (i.e., to lower the height ratio between the front and rear sections). As would be understood by those of ordinary skill in the art, corner points between the front section 106 and the rear section 107 of the crush can 102 may then be connected to create an intermediate profile along a longitudinal axis of the crush can 102.

Figure 11C:
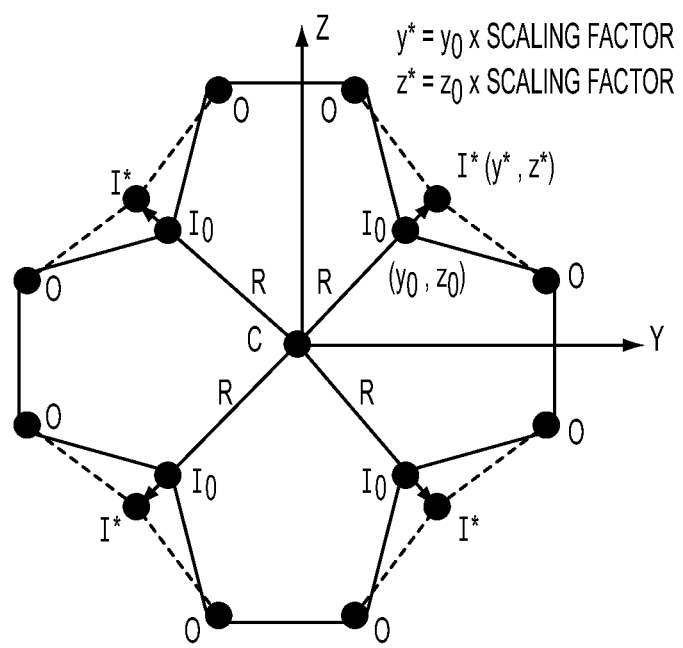

As illustrated in FIG. 11C, a scaling factor may then be applied to both the front section 106 and the rear section 107 of the crush can 102. In other words, to adjust the shape of the front section 106, a front scaling factor may be applied to coordinates of the front cross section 106; and to adjust the shape of the rear cross section 107, a rear scaling factor may be applied to coordinates of the rear section 107. For explanation purposes, FIG. 11C generically represents both the front section 106 and the rear section 107 of the crush can 102. In this parameterization process, as shown in FIG. 11C, radial directions R may be defined between a center point C of each section (front and rear) and inner corner points $I_0$ of each section. Coordinates $y_0$ and $z_0$ of the inner corner points $I_0$ may then be multiplied by a given scaling factor to form new coordinates $y^*$ and $z^*$ for new inner corner points $I^*$. As shown in Table 1, based on the defined DOE, the coordinates $y_0$ and $z_0$ for each section (front and rear) may be multiplied by a scaling factor between an upper and lower bound. In certain embodiments, for example, the coordinates $y_0$ and $z_0$ of the front section 106 may be multiplied by a front scaling factor in a range of about 0.5 to about 2.0; and coordinates $y_0$ and $z_0$ of the rear section 107 may be multiplied by a rear scaling factor in a range of about 0.5 to about 2.0. As illustrated by the dotted line in FIG. 11C, the shape of each section (front and rear) may then be adjusted by connecting the new inner corner points $I^*$ for each section to adjacent outer corner points O for each section.

FIGS. 12A-12F illustrate, for example, how scaling factors in accordance with the present teachings can be utilized to change the shape of a front section 106 and rear section 107 of a crush can 102A-F. FIG. 12A shows a baseline shape, as illustrated in FIG. 10, wherein the front scaling factor is 1 and the rear scaling factor is 1. FIGS. 12B-12F show morphed shapes, wherein the front and rear scaling factors are varied in a range of about 0.5 to about 2.0 (i.e., between the upper and lower bound as shown in Table 1). FIG. 12B, for example, shows a morphed shape, wherein the front scaling factor is 0.751 and the rear scaling factor is 1.392. Those of ordinary skill in the art would understand, that the embodiments of FIGS. 12A-12F are exemplary only, and that scaling factors are variable and dependent upon a particular DOE. Accordingly, those of ordinary skill in the art would understand that the geometry of a crush can may take on various shapes, dimensions, and/or configurations throughout the parameterization process without departing from the scope of the present teachings and claims. Furthermore, as illustrated in FIGS. 12B-12F, in certain embodiments, the geometry of the cross section may vary between a front section and a rear section of the crush can.

Figure 13:
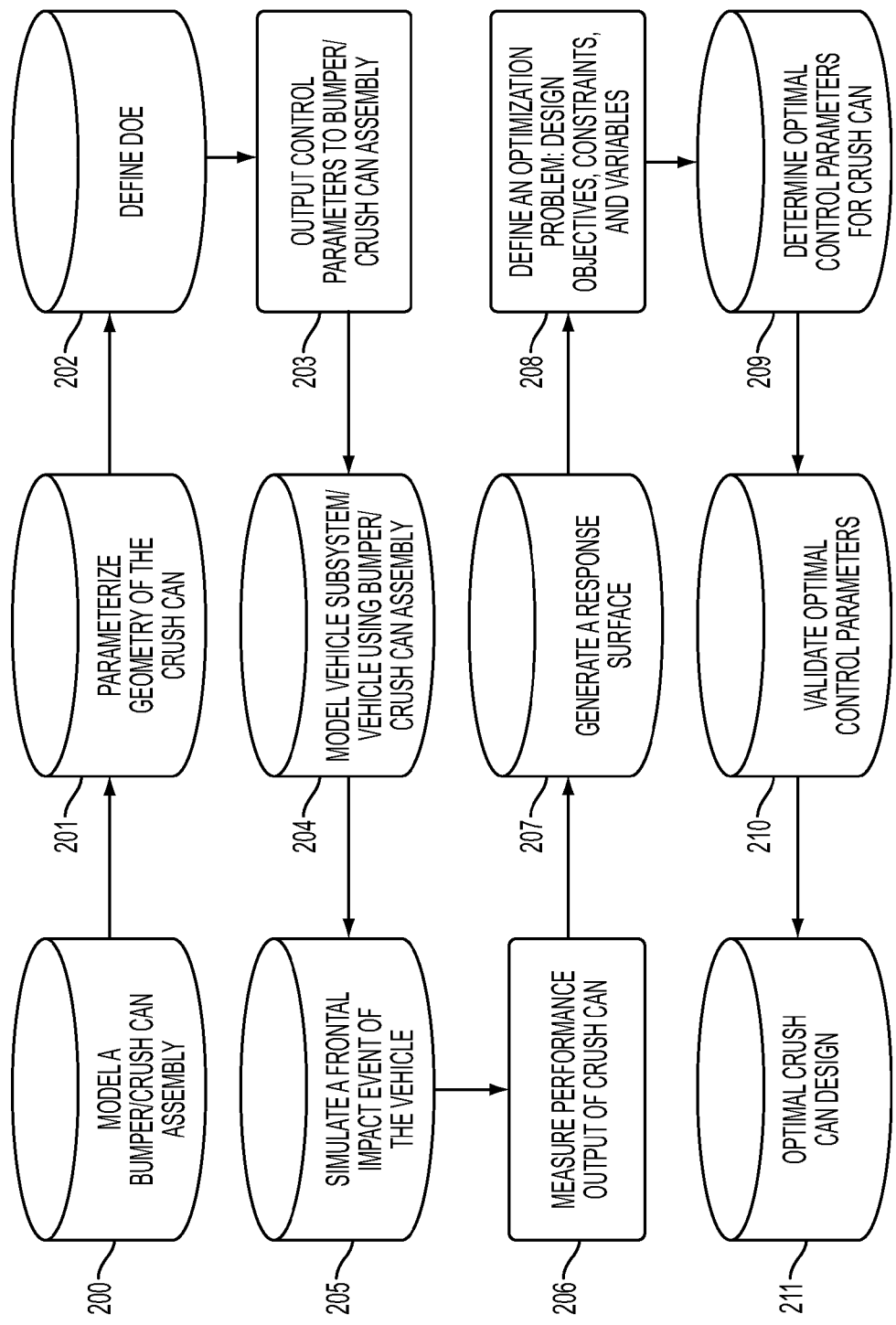
FIG. 13 is a logic flow diagram illustrating an exemplary method for optimizing a crush can in accordance with the present teachings.

FIG. 13 is a logic flow diagram depicting an exemplary method for optimizing a strengthening member, such as, for example, a twelve-cornered crush can 102, in accordance with the parametric modeling process described above. As shown at step 200 in FIG. 13, a vehicle assembly including a twelve-cornered strengthening member (e.g., a vehicle assembly 100 as depicted in FIG. 9, including a bumper 103 and a crush can 102) is modeled, for example using a finite element model. The present teachings contemplate using any known methods and/or techniques as would be understood by those of ordinary skill in the art to build a finite element model of the vehicle assembly 100. Certain exemplary embodiments of the present teachings consider, for example, building the finite-element model using Auto-CAD® developed by Autodesk® or other computer-aided design (CAD) based software applications.

At step 201, the crush can 102 is parameterized using a parametric modeling tool. The present teachings contemplate using any known methods and/or techniques as would be understood by those of ordinary skill in the art to build a parametric model of the crush can 102. Certain exemplary embodiments of the present teachings consider, for example, building the parametric model using MeshWorks developed by Detroit Engineered Products Inc. (DEP) or Pro/ENGI-NEER developed by PTC®.

As explained in detail above, the geometry of the crush can 102 can be parameterized with a plurality of control parameters. In certain embodiments, for example, the geometry of the crush can 102 may be parameterized by generating a lateral width (Width_y), a vertical width (Width_z), a taper ratio, a front scaling factor, and a rear scaling factor. As above, the lateral width and the vertical width may generate dimensions for a front section 106 of the crush can 102 (see FIG. 11A), the taper ratio may generate a height ratio between the front section 106 and a rear section 107 of the crush can 102 (see FIG. 11B), the front scaling factor may scale coordinates $y_0$ and $z_0$ of inner corner points $I_0$ of the front section 106 of the crush can 102 (see FIG. 11C), and the rear scaling factor may scale coordinates $y_0$ and $z_0$ of inner corner points $I_0$ of the rear section 107 of the crush can 102 (see FIG. 11C).

As shown at step 202 of FIG. 13, a design of experiment (DOE) is defined using the plurality of control parameters. As those of ordinary skill in the art would understand, DOE is a systematic approach to the investigation of a system or process. The DOE may, for example, utilize a series of structured tests to make planned changes to input variables to the system or process, while assessing the effects of the changes on a pre-defined output. In other words, DOE is a methodology that maximizes the knowledge gained from experimental data, allowing a user to extract a large amount of information from a limited number of test runs. To optimize a design, for example, the DOE may provide an optimization algorithm with an initial population of designs from which the algorithm can "learn" (i.e., the DOE may provide the initial data points). Accordingly, as those of ordinary skill in the art would understand, defining a DOE may comprise generating structured data tables (i.e., tables that contain an amount of structured variation) to be used as a basis for multivariate modeling. As illustrated in Table 1, for example, in certain embodiments, the DOE may define an upper bound value and a lower bound value for each of the control parameters. In other words, the DOE defines various designs, each design comprising a combination of the five control parameters (i.e., lateral width (Width_y), vertical width (Width_z), taper ratio, front scaling factor, and rear scaling factor), wherein each of the five control parameters is bounded by the defined upper and lower bound. Accordingly, as shown at step 203, the DOE outputs various combinations of the five control parameters to the model of the bumper/crush can assembly 100 (i.e., the bumper/crush can assembly 100 may be updated with various combinations of control parameters). The present teachings contemplate using any known methods and/or techniques as would be understood by those of ordinary skill in the art to define the DOE. Certain exemplary embodiments of the present teachings consider, for example, using ModeFRONTIERT™ developed by ESTECO, Isight developed by SIMULIA, or various other multi-objective optimization and design applications written to couple CAD tools, finite element structural analysis, and/or computational fluid dynamics.

At step 204, a vehicle is modeled, for example, using a finite element model based on the DOE (e.g., a vehicle subsystem or a full vehicle is modeled using a bumper/crush can assembly). As above, the present teachings contemplate using any known methods and/or techniques as would be understood by those of ordinary skill in the art to build a finite element model of the vehicle.

As shown at step 205 of FIG. 13, a frontal impact event is simulated with the vehicle model. The present teachings contemplate using any known methods and/or techniques as would be understood by those of ordinary skill in the art to simulate the frontal impact event. Certain exemplary embodiments of the present teachings consider, for example, simulating a crash using LS-DYNA® simulation software developed by Livermore Software Corp, RADIOSS™ offered by Altair Engineering Inc., PAM-CRASH developed by ESI Group, or Abaqus/Explicit developed by SIMULIA. During each simulation, a performance output is measured for the crush can 102, subject to the frontal impact event, as indicated at step 206. As those of ordinary skill in the art would understand, as used herein the term "performance output" refers to outputs of interest (i.e., from the simulation), which are used to measure or quantify the performance or functionality of the part being optimized (e.g., the crush can 102). In certain embodiments, for example, the outputs of interest include a mass of the can 102 (i.e., a mass increase or decrease from baseline) that is measured with relation to energy absorption (i.e., an amount of internal energy absorbed by the crush can 102 during the course of its deformation) and an average crush force of the crush can 102 (i.e., the average force needed to crush the crush can 102). In certain additional embodiments, the outputs of interest include a length of the crush can 102 that has been crushed. Furthermore, the performance output may be measured during both high and low speed frontal impact events.

At step 207, a response surface is generated based on the performance output from the simulation. As those of ordinary skill in the art would understand, response surface methods (RSMs) are generally used to examine the "surface" or the relationship between a simulated response and the factors affecting the response. Regression models are used, for example, to analyze the response, focusing on the nature of the relationship between the response and the input factors rather than identification of important input factors. Accordingly, an RSM tries to interpolate available test data in order to locally or globally predict the correlation between the control parameters and the optimization objectives (i.e., the optimization problem). The present teachings contemplate using any known methods and/or techniques as would be understood by those of ordinary skill in the art to generate the response surface. Certain exemplary embodiments of the present teachings consider, for example, generating the response surface using a multi-objective optimization application, such as ModeFRONTIER™.

As would be understood by those of ordinary skill in the art, a set of optimized control parameters (i.e., for the crush can 102) may be determined based on the response surface. As indicated at step 208 of FIG. 13, for example, based on a particular application, an optimization problem is defined for the crush can 102. In certain exemplary embodiments, based on vehicle type and/or application, design objectives, design constraints, and design variables for the crush can 102 may be defined within the optimization application. As shown at step 209, a set of optimized control parameters is determined by searching for a solution to the optimization problem based on the response surface. In other words, the optimization application may perform various virtual runs searching for a solution to the optimization problem. As would be understood by those of ordinary skill in the art, as used herein the term "virtual runs" refers to the process of predicting performance outputs for a design (i.e., a set of optimized control parameters) using the response surface (i.e., based on the outputs extracted from actual simulations).

In accordance with certain exemplary embodiments of the present teachings, as shown at step 210, the determined set of optimized control parameters may be validated, for example, by performing a confirmation run. As above, a crush can 102 may be modeled using the optimized control parameters, a frontal impact event may be simulated with a vehicle model including the crush can 102, and a performance output may be measured for the crush can 102. If the crush can's performance is acceptable, the optimization application may generate an optimum design for the crush can 102, as indicated by the last step 211, shown in the flow diagram of FIG. 13.

As those of ordinary skill in the art would understand, the above method is exemplary only and not intended to be construed as requiring that its steps be performed in a specific order. Accordingly, where a method claim does not actually recite an order to be followed by its steps, or it is not otherwise specifically stated in the claims or descriptions that the steps are to be limited to a specific order, it is no way intended that any particular order be inferred. Furthermore, the present teachings and claims are not intended to be limited to the above recited steps, and may include various additional steps and/or combinations of steps as would be understood by those of ordinary skill in the art.

EXAMPLE

To further demonstrate the above optimization method, an exemplary crush can was modeled and experimental test runs were conducted, as shown and described below with reference to Table 2 and FIGS. 14-16.

TABLE 2

Summary of Optimization

| Parameter/Performance | Baseline | Optimal |
|---|---|---|
| Width_y | 0 | 10.88 |
| Width_x | 0 | 5.65 |
| Taper Ratio | 1.0 | 1.11 |
| Front Scaling Factor | 1.0 | 1.46 |
| Rear Scaling Factor | 1.0 | 0.95 |
| Mass (Kg) | 1.32 | 1.34 |
| Average Crush Force (KN) | 86.3 | 109.2 |
| Energy Absorption (J) | 15381 | 19230 |

As illustrated in Table 2, to optimize a twelve-cornered crush can, a bumper/crush can assembly was modeled and the geometry of the crush can was parameterized, establishing a set of baseline control parameters (Width_y=0, Width_z=0, taper ratio=1, front scaling factor=1.0, and rear scaling factor=1.0). To create a complete crush model, a vehicle subsystem, including the bumper/crush can assembly, was modeled as a rigid body (i.e., a body having nothing to deform behind it) with a lumped mass of 401 Kg at the vehicle's center of gravity. To establish a set of baseline performance outputs (a 1.32 Kg crush can with an 86.3 KN average crush force and 15381 J of energy absorption), a frontal impact event was simulated using a 35 mph, 100% overlap, frontal rigid barrier mode (i.e., the vehicle was run into a wall at an initial velocity (I.V.) of about 35 mph) to completely crush the crush cans.

Based on the defined DOE (see Table 1), the frontal impact event was then simulated using various combinations of the five control parameters (i.e., the bumper/crush can assembly was updated with various combinations of control parameters) to generate a response surface. To optimize the crush can dimensions, an optimization problem was defined to minimize the mass of the crush can, while providing energy absorption of greater than about 15 KJ for each can, and an average crush force of greater than about 100 KN and less than about 110 KN per can.

Figure 14:
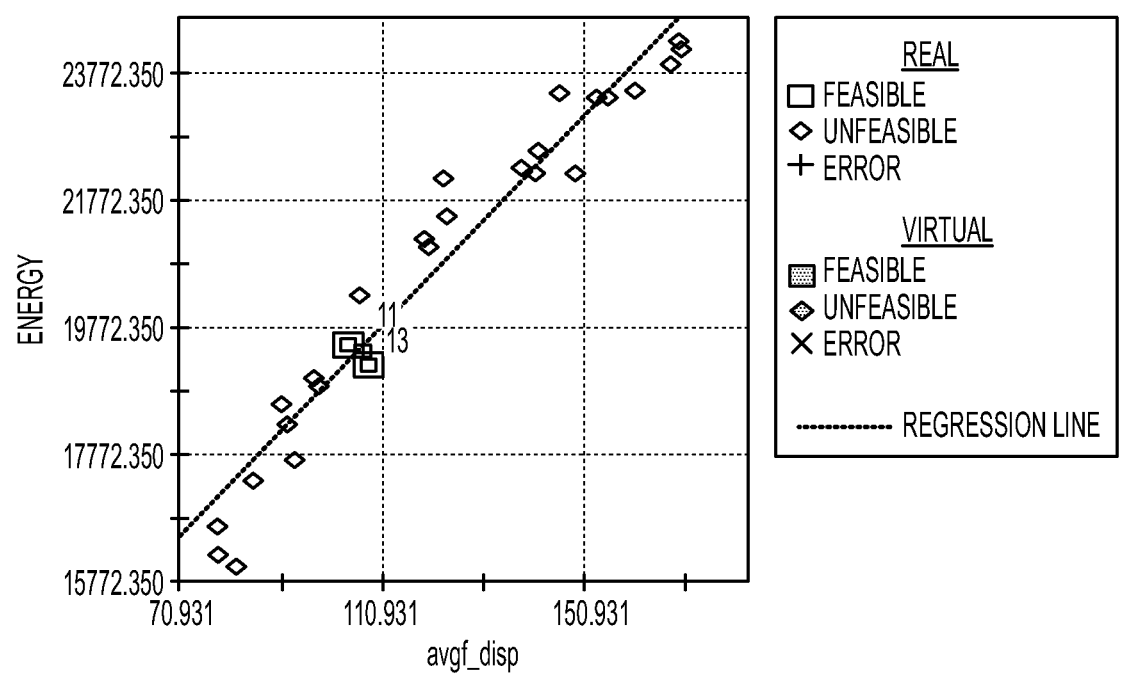
FIG. 14 shows results obtained from crash simulations of energy as a function of average crush force in a displacement domain for various crush can designs.

As illustrated in FIG. 14, both "real" and "virtual" simulations were run, wherein real simulation results were obtained from actual simulation results (i.e., run using the DOE) and virtual simulation results were obtained from the optimizer returning solutions based on the response surface (i.e., fitted using actual simulation results). As shown, feasible solutions were identified based on the optimization problem (i.e., solutions which satisfied the energy and force constraints). FIG. 14 illustrates how energy absorption varied with average crush force, which was measured, for example, based on the displacement domain (avgf_disp). As shown, energy absorption increased with an increase in the average crush force.

There was, however, an imposed force constraint of 110 KN (e.g., to prevent deformation of rails behind the crush cans). Accordingly, as shown in FIG. 14, solutions which maximized energy absorption within the force constraint were identified as feasible solutions. In other words, as would be understood by those of ordinary skill in the art, a pareto plot, as defined, for example, in the optimization software, was used to see how the design solutions would fall by simultaneously plotting two objective functions. The numbers 11 and 13, for example, were the design solutions which satisfied the optimization problem. To determine a set of corresponding control parameters (i.e., a set of optimized control parameters) for design numbers 11 and 13, a design variables table can then be consulted as would be understood by those of ordinary skill in the art.

Figure 15B:
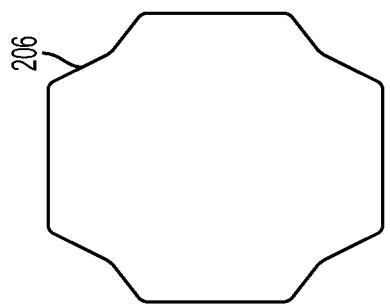
FIGS. 15A-15C illustrate an optimized crush can design.
Figure 15C:
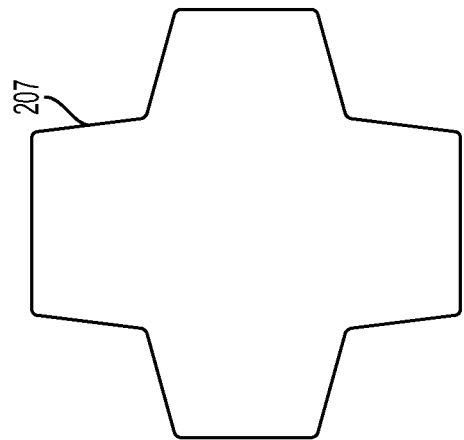
Figure 15A:
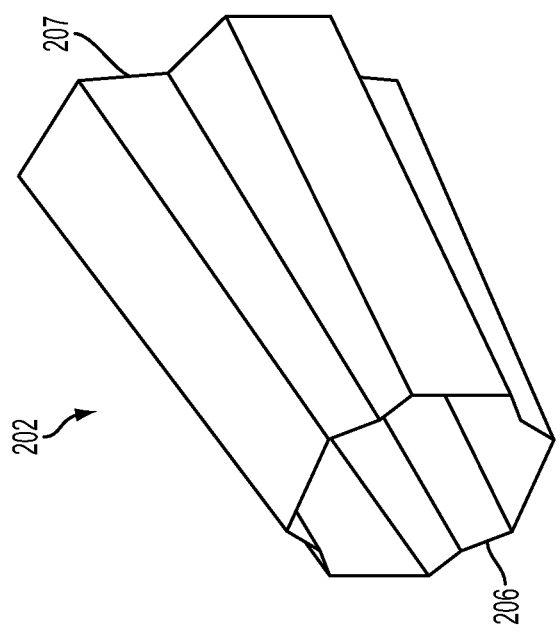
Figure 16:
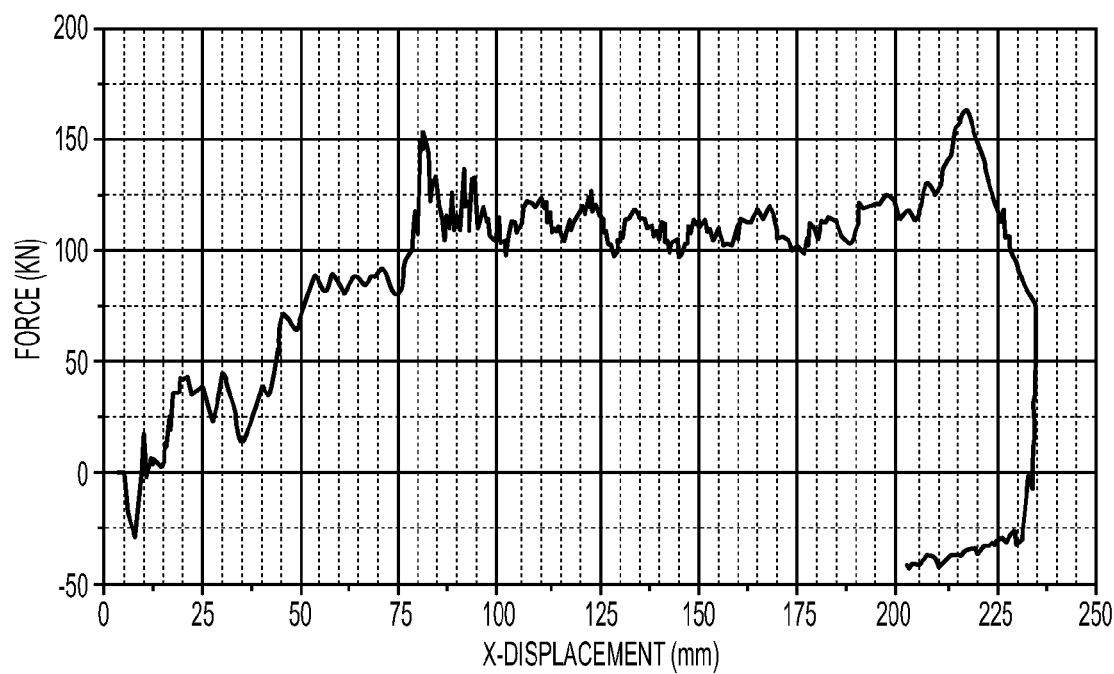
FIG. 16 shows results obtained from a crash simulation of force as a function of displacement for the optimized crush can design of FIGS. 15A-15C.

As shown in FIGS. 15A-15C, a crush can 202 was then modeled (i.e., having a front section 206 and a rear section 207) using the optimized control parameters, and a frontal impact event was simulated with the vehicle subsystem model including the crush can 202. The results of the frontal impact event are shown in FIG. 16. As illustrated in FIG. 16, an acceptable performance output (force (KN) vs. x-displacement (mm)) was measured for the crush can 202 (i.e., the imposed force constraint of 110 KN was met between about 100 to about 200 mm of crush).

In accordance with certain embodiments, to reduce complexity and save computation time, a sub-system model can be utilized to track crush can performance in a high speed frontal impact event by imposing derived constraints from a low speed frontal impact event (e.g., accounting for the carry-over strength from a vehicle's side-rails). For example, using an average side rail strength of about 130 KN, the strength of the crush can may be set at a lower level (e.g., 110 KN or less) to insure that the crush can crushed first (prior to the side rails). Accordingly, the crush or stroke during a low speed frontal impact event can be inherently minimized by maximizing the crush strength for the crush can (e.g., within the designated constraint). Thus, although both low speed and high speed crashes may be simulated using the above method (e.g., through simultaneous optimizations), a simple high speed model may track the high speed response and optimize the design to maximize energy absorption through the entire crush distance with a reduced crush can weight. The improved performance of the crush can may then be verified by spot checking a low speed event (i.e., since the low speed requirements were backed into the optimization problem in the form of constraints to the force level attained).

Thus, the method illustrated above with regard to Table 2 and FIGS. 14-16 demonstrates how to optimize a twelve-cornered strengthening member to provide a desired crush result in terms of energy absorption and crush distance. Accordingly, methods for optimizing a twelve-cornered strengthening member in accordance with the present teachings can be implemented to provide crush cans that are progressive, stable, and energy efficient in both high and low speed frontal impact events. Those having ordinary skill in the art would understand the optimization problem described above and the crash mode used are exemplary only and that other optimization problems and/or crash modes may be chosen depending on various factors without departing from the present teachings.

Although various exemplary embodiments shown and described herein relate to methods for optimizing a twelve-cornered crush can in an automobile bumper assembly, those having ordinary skill in the art would understand that the methodology described may have a broad range of application to strengthening members useful in a variety of applications. Ordinarily skilled artisans would understand, for example, how to modify the exemplary methods described herein to optimize the geometry of a strengthening member used in an application other than a bumper assembly.

Accordingly, while the present teachings have been disclosed in terms of exemplary embodiments in order to facilitate a better understanding, it should be appreciated that the present teachings can be embodied in various ways without departing from the scope thereof. Therefore, the present teachings should be understood to include all possible embodiments which can be embodied without departing from the scope of the teachings set out in the appended claims.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present teachings. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the devices and methods of the present disclosure without departing from the scope of its teachings. Other embodiments of the disclosure will be apparent to those skilled in the art from consideration of the specification and practice of the teachings disclosed herein. It is intended that the specification and embodiment described herein be considered as exemplary only.

What is claimed is:

1. A method for optimizing an axial crush performance of a twelve-cornered strengthening member, the method comprising:
   modeling a vehicle assembly including a strengthening member having a twelve-cornered cross section comprising sides and twelve corners creating internal angles and external angles between the sides, wherein each of the internal angles and the external angles are greater than 90 degrees and less than 180 degrees and wherein the strengthening member is a crush can, a roof structure, a front rail, a side rail, or a cross member;
   parameterizing a geometry of the strengthening member with a plurality of control parameters;
   defining a design of experiment using the plurality of control parameters;
   modeling a vehicle using the vehicle assembly;
   simulating a frontal impact event with the vehicle;
   generating a response surface based on the frontal impact event;
   determining a set of optimized control parameters for the strengthening member based on the response surface to optimize an axial crush performance of the strengthening member; and
   based at least in part on the optimized control parameters, manufacturing the strengthening member having the twelve-cornered cross section.

2. The method of claim 1, wherein modeling the vehicle assembly comprises modeling a bumper and a crush can having a twelve-cornered cross section.

3. The method of claim 1, wherein parameterizing the geometry with the plurality of control parameters comprises generating a lateral width, a vertical width, a taper ratio, a front scaling factor, and a rear scaling factor.

4. The method of claim 3, wherein generating the lateral width and the vertical width comprises generating dimensions for a front section of the strengthening member.

5. The method of claim 4, wherein generating the taper ratio comprises generating a height ratio between the front section and a rear section of the strengthening member.

6. The method of claim 5, wherein generating the front scaling factor comprises generating a factor which scales coordinates of inner corner points of the front section of the strengthening member and generating the rear scaling factor comprises generating a factor which scales coordinates of inner corner points of the rear section of the strengthening member.

7. The method of claim 1, wherein defining a design of experiment comprises defining an upper bound value and a lower bound value for each of the plurality of control parameters.

8. The method of claim 1, wherein modeling a vehicle using the vehicle assembly comprises modeling a vehicle subsystem or a full vehicle based on the design of experiment.

9. The method of claim 1, wherein simulating a frontal impact event with the vehicle comprises measuring a performance output of the strengthening member during a high speed frontal impact event and/or a low speed frontal impact event.

10. The method of claim 9, wherein measuring a performance output of the strengthening member comprises measuring energy absorption, an average crush force, and a mass of the strengthening member.

11. The method of claim 10, wherein determining the set of optimized control parameters comprises defining an optimization problem including design objectives, design constraints, and design variables for the strengthening member to optimize the axial crush performance of the strengthening member.

12. The method of claim 11, wherein determining the set of optimized control parameters comprises searching for a solution to the optimization problem based on the response surface.

13. The method of claim 1, further comprising validating the set of optimized control parameters by simulating a frontal impact event with the set of optimized control parameters.

14. A method of optimizing a strengthening member geometry for axial crush performance in an automotive vehicle, comprising:
   modeling a strengthening member having a twelve-cornered cross section comprising sides and corners creating internal angles and external angles, wherein each of the internal angles and the external angles are greater than 90 degrees and less than 180 degrees and wherein the strengthening member is a crush can, a roof structure, a front rail, a side rail, or a cross member;
   simulating a frontal impact on the modeled cross section;
   determining a set of optimized parameters based on results of the simulated impact to optimize an axial crush performance of the strengthening member; and
   manufacturing a strengthening member having an optimized twelve-cornered cross section based on the optimized parameters.

15. The method of claim 14, further comprising validating the optimized parameters by simulating an impact on a strengthening member having a twelve-cornered cross section configured according to the optimized parameters.

16. The method of claim 14, further comprising defining a design of experiment using a plurality of control parameters and modeling the strengthening member having the twelve-cornered cross section based on the design of experiment.

17. The method of claim 16, wherein the defining the design of experiment comprises defining an upper bound value and a lower bound value for each of the plurality of control parameters.

18. The method of claim 14, wherein simulating a frontal impact event with the vehicle comprises measuring a performance output of the strengthening member during a high speed frontal impact event and/or a low speed frontal impact event.

19. A method of optimizing an axial crush strength of a strengthening member comprising:
   modeling a vehicle assembly including a strengthening member having a twelve-cornered cross section using a modeling program of a computer;
   parameterizing a geometry of the strengthening member with a plurality of control parameters of the strengthening member and value ranges for the control parameters;
   wherein the parameterizing comprises selecting angles for internal angles and external angles between sides of the twelve-cornered cross section, wherein each of the internal angles and the external angles are greater than 90 degrees and less than 180 degrees;
   modeling a vehicle based on the vehicle assembly with the modeling program of the computer;
   simulating a frontal impact event of a vehicle by using a simulation program of the computer, the vehicle including the strengthening member configured according to the control parameters;
   generating a response surface based on the frontal impact event and determining a set of the control parameters of the strengthening member based upon the response surface to optimize an axial crush strength of the strengthening member; and
   outputting the set of the control parameters for the strengthening member based upon the response surface.

20. The method of claim 19, wherein the output is input to a manufacturing system for manufacturing the strengthening member.

21. The method of claim 19, wherein the strengthening member has a twelve-cornered cross section.

22. The method of claim 19, wherein the generating of the response surface comprises using a multi-objective optimization application to generate the response surface.

23. The method of claim 19, further comprising determining the set of control parameters by searching for a solution via the response surface to an optimization problem defined for the strengthening member for optimizing the axial crush performance of the strengthening member.

24. The method of claim 19, wherein the simulating the front impact event comprises a plurality of simulated frontal impact events using different values for the control parameters of the strengthening member.

25. The method of claim 19, wherein generating the response surface comprises generating a taper ratio control parameter, wherein the taper ratio comprises a height ratio between a front section and a rear section of the strengthening member.

26. A method of optimizing an axial crush strength for a strengthening member geometry for use in an automotive vehicle, comprising:
   simulating a frontal impact on a strengthening member modeled with a plurality of control parameters;
   generating a response surface based on the frontal impact event and varying the control parameters of the strengthening members to provide a set of optimized parameters to optimize an axial crush performance of the strengthening member; and
   manufacturing a strengthening member having a twelve-cornered cross section comprising sides and twelve corners creating internal angles and external angles between the sides based on the optimized parameters, wherein each of the internal angles and the external angles are greater than 90 degrees and less than 180 degrees.

27. The method of claim 1, wherein selecting the strengthening member cross-section comprises selecting the internal angles to range from about 100° to about 110°, and selecting the external angles to range from about 105° to about 130°.

28. The method of claim 1, wherein selecting the strengthening member cross-section comprises selecting the sides and the corners such that, along a perimeter of the twelve-cornered cross section, the external angles are separated from each other by not more than two internal angles.

29. A method for optimizing an axial crush performance of a twelve-cornered strengthening member, the method comprising:
   parameterizing a geometry of a strengthening member having a twelve-cornered cross section with a plurality of control parameters,
   wherein the parameterizing comprises selecting angles for internal angles and external angles between sides of the twelve-cornered cross section, wherein each of the internal angles and the external angles are greater than 90 degrees and less than 180 degrees;
   simulating a frontal impact event with a vehicle including the strengthening member;
   determining a set of optimized control parameters for the strengthening member to optimize an axial crush performance of the strengthening member; and
   manufacturing the strengthening member having the twelve-cornered cross section.

30. The method of claim 19, wherein the parameterizing the geometry of the strengthening member comprises varying at least one of shape, dimensions, and configuration of the strengthening member, based upon the response surface.

31. The method of claim 26, wherein providing the set of optimized parameters maximizes at least one of a crush strength of the strengthening member and energy absorption through an entire crush distance for the strengthening member.

* * * * *